US008390161B2

(12) United States Patent
Critchley et al.

(10) Patent No.: US 8,390,161 B2
(45) Date of Patent: Mar. 5, 2013

(54) ELECTRIC MOTOR HAVING A RAIN GUARD

(75) Inventors: Matthew W. Critchley, Milwaukee, WI (US); Frank E. Staigl, III, Greenville, OH (US)

(73) Assignee: Regal Beloit America, Inc., Beloit, WI (US)

(*) Notice: Subject to any disclaimer, the term of this patent is extended or adjusted under 35 U.S.C. 154(b) by 190 days.

(21) Appl. No.: 12/948,867

(22) Filed: Nov. 18, 2010

(65) Prior Publication Data

US 2011/0074254 A1 Mar. 31, 2011

Related U.S. Application Data

(63) Continuation-in-part of application No. 12/893,533, filed on Sep. 29, 2010.

(60) Provisional application No. 61/246,875, filed on Sep. 29, 2009.

(51) Int. Cl.
*H02K 5/10* (2006.01)
*H02K 9/06* (2006.01)

(52) U.S. Cl. .............. 310/88; 310/62; 310/400

(58) Field of Classification Search ........... 310/60 R, 310/62, 63, 89, 410, 88; 415/171.1, 174.5, 415/229; *H02K 9/06, 5/10*
See application file for complete search history.

(56) References Cited

U.S. PATENT DOCUMENTS

| | | | |
|---|---|---|---|
| 2,913,169 A | 11/1959 | Wilsmann | |
| 3,532,399 A | 10/1968 | Gray | |
| 3,580,588 A * | 5/1971 | Allen et al. | 277/420 |
| 3,774,982 A | 11/1973 | Nakamura et al. | |
| 3,782,851 A * | 1/1974 | Hackbarth et al. | 415/198.1 |
| 3,799,634 A | 3/1974 | Sernetz et al. | |
| 4,277,114 A | 7/1981 | Lindegger | |
| 4,427,202 A | 1/1984 | Backlin | |
| 4,464,593 A | 8/1984 | Kofink | |
| 4,597,582 A | 7/1986 | Muller | |
| 4,763,904 A | 8/1988 | Martinie | |
| 4,890,941 A | 1/1990 | Calafell, II et al. | |
| 4,955,462 A | 9/1990 | Bilodeau et al. | |
| 4,972,939 A | 11/1990 | Uttke et al. | |
| 4,997,340 A | 3/1991 | Zinsmeyer et al. | |
| 5,011,301 A | 4/1991 | Martinie | |
| 5,025,917 A | 6/1991 | Smith et al. | |
| 5,188,214 A | 2/1993 | Uttke et al. | |
| 5,261,528 A | 11/1993 | Bouchal | |
| 5,494,173 A | 2/1996 | Deister et al. | |
| 5,636,848 A | 6/1997 | Hager et al. | |
| 5,883,449 A * | 3/1999 | Mehta et al. | 310/60 R |
| 6,017,037 A | 1/2000 | Fedorovich | |
| 6,224,322 B1 | 5/2001 | Calboreanu | |
| 6,247,702 B1 | 6/2001 | Long et al. | |
| 6,467,773 B1 | 10/2002 | Rinaldo | |
| 6,629,816 B2 | 10/2003 | Langston et al. | |
| 6,682,077 B1 | 1/2004 | Letourneau | |
| 6,834,860 B2 * | 12/2004 | Rinaldo | 277/418 |
| 6,845,986 B2 | 1/2005 | Hood et al. | |

(Continued)

*Primary Examiner* — Tran N. Nguyen
*Assistant Examiner* — Thomas Truong
(74) *Attorney, Agent, or Firm* — Michael Best & Friedrich LLP (57) ABSTRACT

A motor includes a shaft that extends along a rotational axis and an end frame that includes a first surface that is substantially normal to the axis. A first plurality of annular features are arranged concentrically about the rotational axis and coupled to the first surface. A fan is mounted to the rotating shaft and including a slinger portion and a second surface. A second plurality of annular features are arranged concentrically about the rotational axis and coupled to the second surface. The first plurality of annular features cooperate with the second plurality of annular features to form a non-contact seal between the fan and the end frame.

24 Claims, 6 Drawing Sheets

U.S. PATENT DOCUMENTS

| | | |
|---|---|---|
| 6,880,223 B2 | 4/2005 | Bednar |
| 7,066,467 B2 | 6/2006 | Sakata |
| 7,364,400 B2 | 4/2008 | Ku et al. |
| 2008/0036155 A1 | 2/2008 | Shimazaki et al. |
| 2008/0246224 A1 | 10/2008 | Pabst et al. |
| 2010/0272586 A1 * | 10/2010 | Hsu et al. .................. 417/354 |

* cited by examiner

ELECTRIC MOTOR HAVING A RAIN GUARD

RELATED APPLICATION

This application is a Continuation in Part of U.S. patent application Ser. No. 12/893,533, filed Sep. 29, 2010, which claims priority to U.S. Provisional Patent Application No. 61/246,875, filed Sep. 29, 2009, the entire content of which are incorporated herein by reference.

BACKGROUND

The present invention relates to electric motors. More particularly, the invention relates to an electric motor that includes a rain guard that inhibits rain water and other moisture from entering a motor housing.

Electric motors, especially pump motors used with swimming pools, may be subject to a variety of environments. In certain climates and installations, the motor may be subject to frequent exposure to rain, leakage, flooding and other sources of liquid water. If water enters the motor housing, it can cause corrosion and other damage to the bearings and electrical components. One potential entry point for liquid water is around the rotor shaft.

SUMMARY

In one embodiment, the invention provides a motor that includes a shaft extending along a rotational axis. An end frame includes a first surface that is substantially normal to the axis. A first plurality of annular features are arranged concentrically about the rotational axis and coupled to the first surface. A fan is mounted to the rotating shaft and includes a slinger portion and a second surface. A second plurality of annular features are arranged concentrically about the rotational axis and are coupled to the second surface. The first plurality of annular features cooperate with the second plurality of annular features to form a non-contact seal between the fan and the end frame.

In another embodiment the invention provides an electric motor that includes a rotor shaft for rotation about an axis. A frame member has a wall substantially perpendicular to the axis. A first side of the wall provides a first plurality of annular features arranged concentrically about the axis. A second side of the wall provides a bearing fixture surrounding the axis. A fan housing extends axially outward from the first side of the wall. A radial bearing is mounted within the bearing fixture and a fan is coupled to the rotor shaft for rotation within the fan housing. A first surface of the fan faces the first side of the wall and has a second plurality of annular features arranged concentrically about the axis. A second surface faces away from the first side of the wall and has a conical cross-section. The first plurality of annular features cooperate with the second plurality of annular features to form a non-contact seal between the fan and the frame member.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
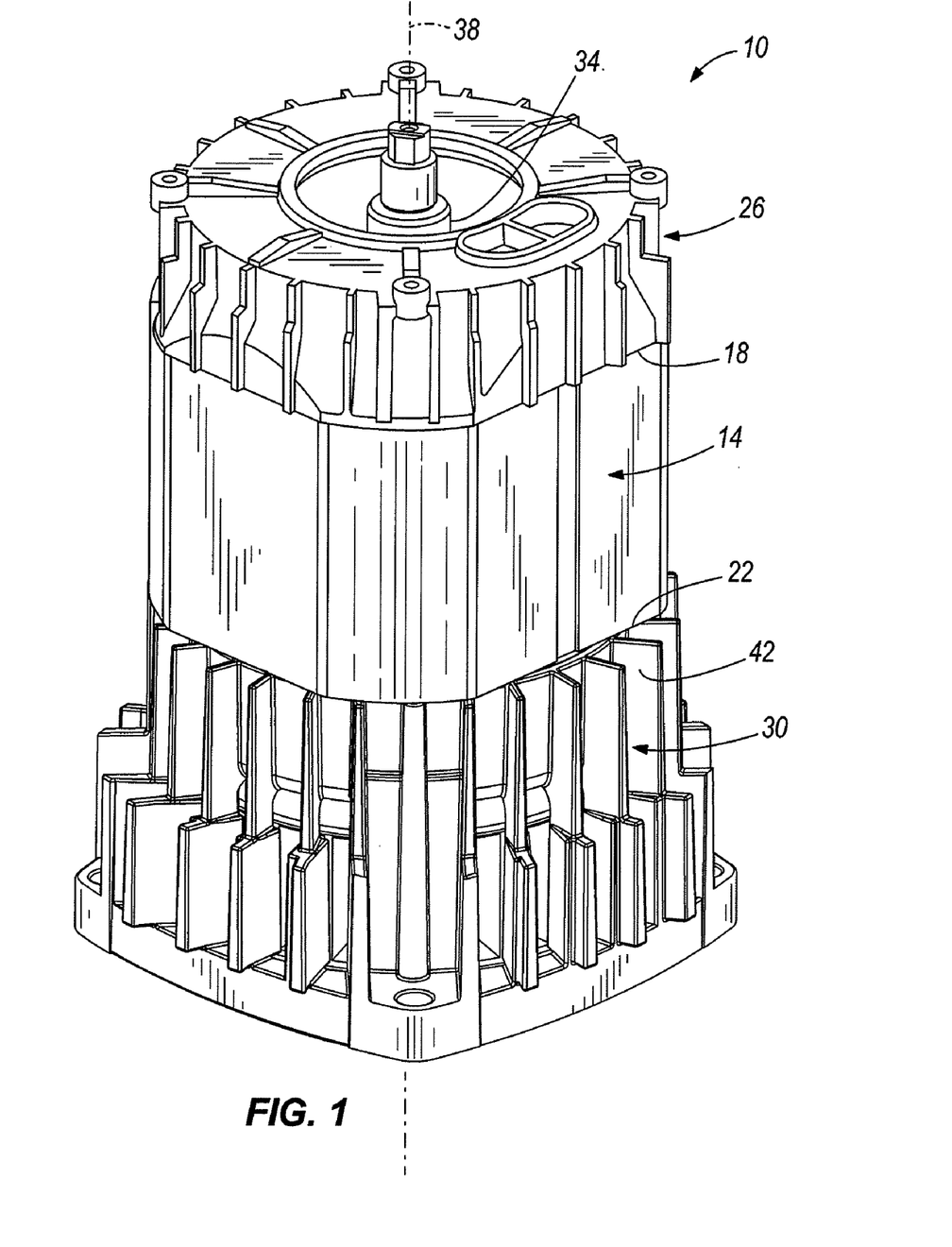
FIG. 1 is a perspective view of a motor assembly according to one aspect of the invention.

FIG. 1 illustrates a fan-cooled motor assembly 10, such as for use with a centrifugal pump. The motor assembly 10 includes a stator 14 that has a first end 18 and a second end 22. The stator 14 is supported at the first end 18 by a end cup 26 and at the second end 22 by an end-frame 30. Although not shown in FIG. 1, an opposite end frame adjacent the end cup 26 supports a first radial bearing and the end frame 30 supports a second radial bearing 74. The radial bearings are provided to rotatably support a rotor shaft 34 for rotation about an axis 38. The rotor shaft 34 supports a motor rotor, as will be well-understood in the art. The end cup 26 and end frame 30 each have a plurality of cooling fins 42 that are provided to maximize heat transfer from the stator 14. Although not shown, in some constructions a tubular shroud is provided between the end cup 26 and end frame 30 as part of a continuous, enclosed airflow path for cooling the motor.

Figure 2:
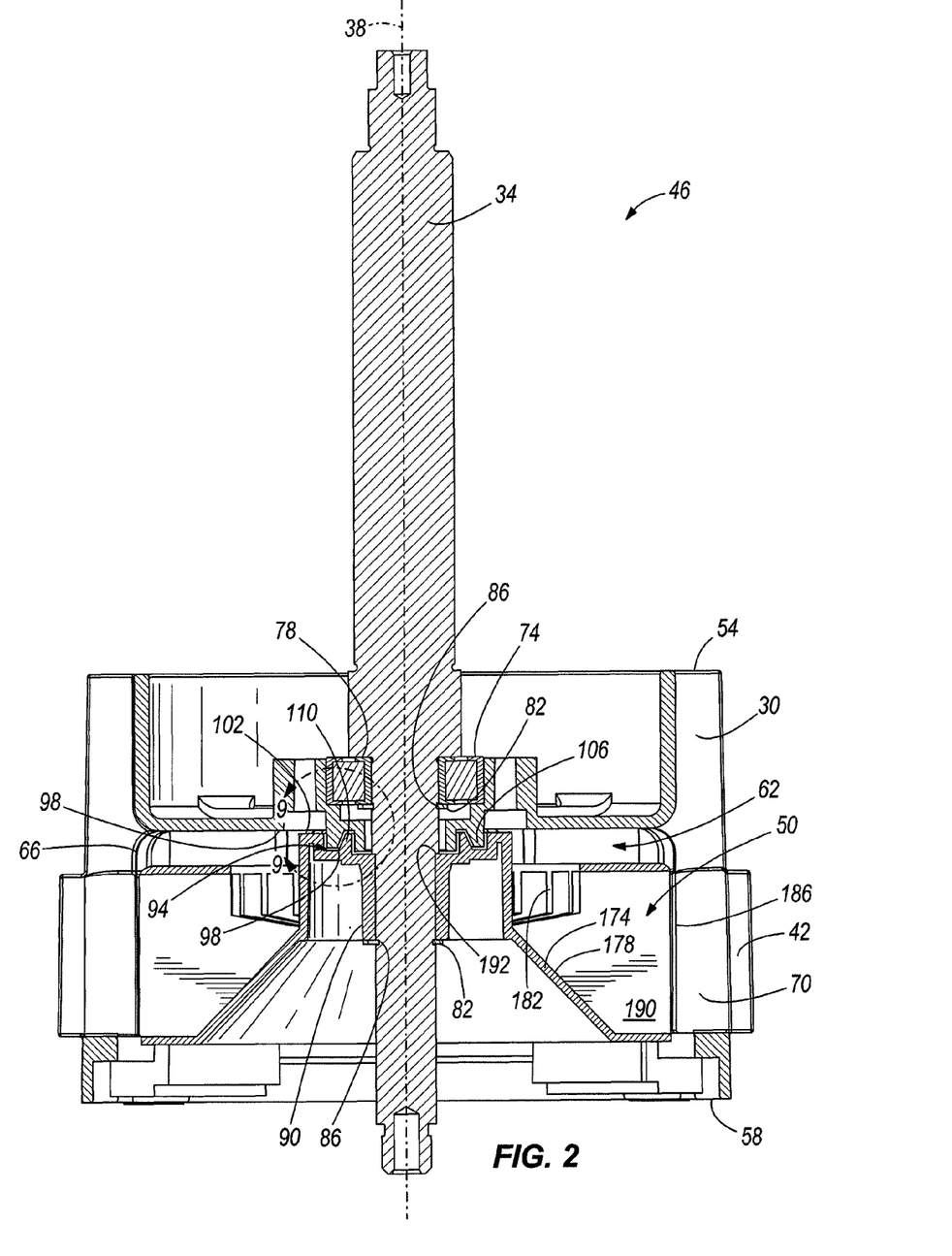
FIG. 2 is a cross-section of an end-frame, fan and rotor assembly of the motor assembly of FIG. 1, taken along line 2-2 of FIG. 1.

FIG. 2 is a cross-section of a fan-end subassembly 46 of the motor assembly shown in FIG. 1. The fan-end subassembly 46 includes the rotor shaft 34 (excluding the rotor), the end frame 30, and a fan 50. The end frame 30 has a winding end 54 and a fan end 58. The fan 50 is positioned within a fan housing 62 at the fan end 58 of the end frame 30. The fan 50 is fixedly coupled to the shaft 34 such that the fan rotates synchronously with the shaft 34. When the shaft 34 rotates, the fan 50 is configured to draw air in through an air inlet portion 66 of the end frame 30. The air is expelled between structural ribs 70 of the fan housing 62. The shaft 34 is rotatably supported in the end-frame 30 by an end frame bearing 74. The end-frame bearing 74 also provides axial, or thrust, support to the shaft 34, in a first direction, at a shaft shoulder 78. The shaft 34 and fan 50 are axially retained in a second direction by resilient retaining clips 82. The resilient retaining clips engage retainer grooves 86 on the shaft 34 adjacent the end frame bearing 74 and a bottom surface 90 of the fan 50. Although not illustrated, a locking clip and screw may be used to fasten the end frame bearing 74 to the end-frame 30.

When the end-frame 30 is assembled with the fan 50, as illustrated in FIG. 2, a non-contact seal 94 is fanned between the end frame 30 and the fan 50. The non-contact seal 94 is formed by cooperating portions of a wall 98 of the end-frame 30 and a top surface 102 of the fan 50. More specifically, concentric annular rings 106 of the end frame 30 cooperate with corresponding concentric annular rings 110 of the fan 50. In the embodiment of FIGS. 2-7 the rings 106 and 110 have a polygonal cross-section. In other embodiments, the rings 106 and 110 may have other cross-sectional profiles such as, for example, semi-circular or pyramidal.

Figure 9:
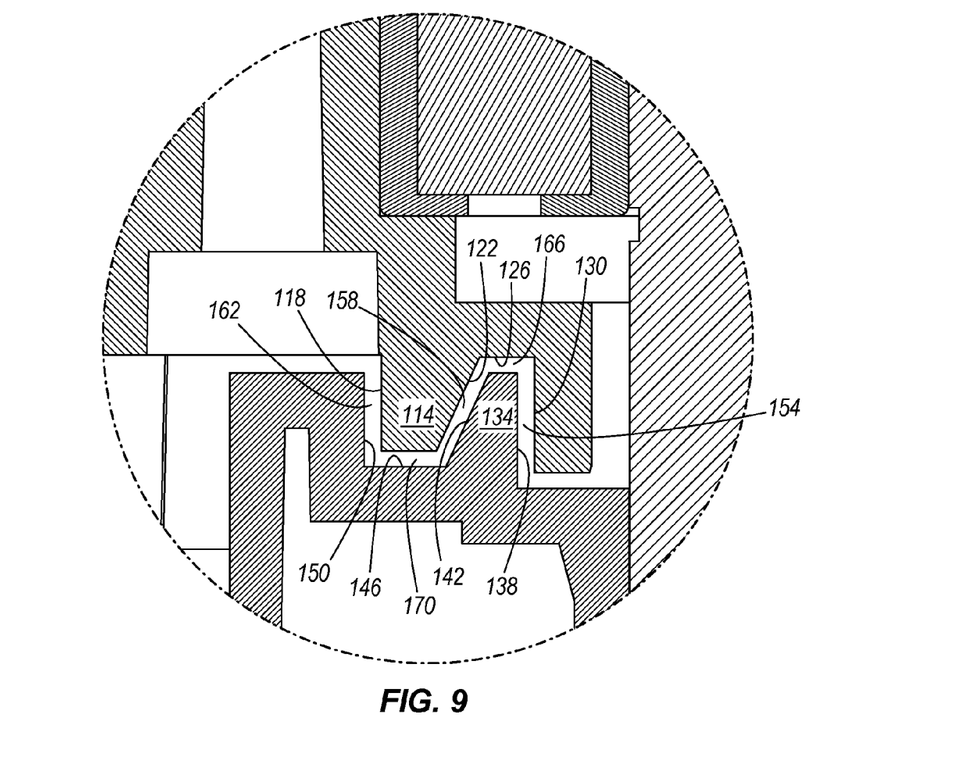
FIG. 9 is an enlarged view of a portion of a non-contact seal of FIG. 2.

FIG. 9 illustrates the geometry of the non-contact seal 94 in greater detail. The rings 106 include a first annular projection 114. The first annular projection 114 has a first cylindrical surface 118 and a first frustoconical surface 122. A first annular recess 126 is partially defined by the first frustoconical surface 122 and a second cylindrical surface 130.

The rings 110 include a second annular projection 134. The second annular projection 134 includes a third cylindrical surface 138 and a second frustoconical surface 142. A second annular recess 146 is partially defined by the second frustoconical surface 142 and a fourth cylindrical surface 150.

The second cylindrical surface 130 cooperates with the third cylindrical surface 138 to define a first gap 154. The first gap 154 is substantially cylindrical. The first frustoconical surface 122 cooperates with the second frustoconical 142 surface to define a second gap 158 that is substantially frustoconical. The first cylindrical surface 118 cooperates with the fourth cylindrical surface 150 to define a third gap 162 that is substantially cylindrical. The second annular projection 134 is disposed within the first annular recess 126 to define a fourth gap 166. The fourth gap 166 is substantially normal to the first gap 154. The first annular projection 114 is disposed within the second annular recess 146 to define a fifth gap 170. The fifth gap 170 is substantially normal to the third gap 162.

The non-contact seal 94 inhibits the entry of water or other contaminants into the motor bearings or rotor compartment, and thereby functions as a "rain guard." The non-contact seal 94 provides sealing action by controlling the passage of fluid (e.g., rain) through the plurality of gaps 154, 158, 162, 166, and 170 between the concentric rings 106 and 110, by centrifugal motion, as well as by the formation of controlled fluid vortices. At higher speeds, centrifugal motion forces liquids, such as rain water, radially outward.

Unlike rotating contact seals, the non-contact seal 94 is frictionless, largely unaffected by high or low temperatures and can be used for high shaft rotating speeds. Sealing depends on the form of the gaps and the length of the leakage path. Clearances between the corresponding concentric rings 106 and 110, as defined by the gaps 154, 158, 162, 166, and 170, typically vary between 0.25 to 1.0 mm, depending on the operating speed and temperature. Smaller gaps produce less leakage but the gap should be large enough to avoid contact. Of course, smaller or larger gaps could be employed if desired.

Returning to FIG. 2, the fan 50 incorporates a slinger 174 that is configured to use centrifugal force to outwardly, radially project any liquid that flows in or around the fan 50 during operation. The slinger 174 acts in conjunction with the non-contact seal 94 to form a second stage rain guard. The slinger 174 includes a frustoconical surface 178 inside the fan 50. The slinger 174 extends between an inlet end 182 and an outlet end 186 of fan blades 190.

Figure 3:
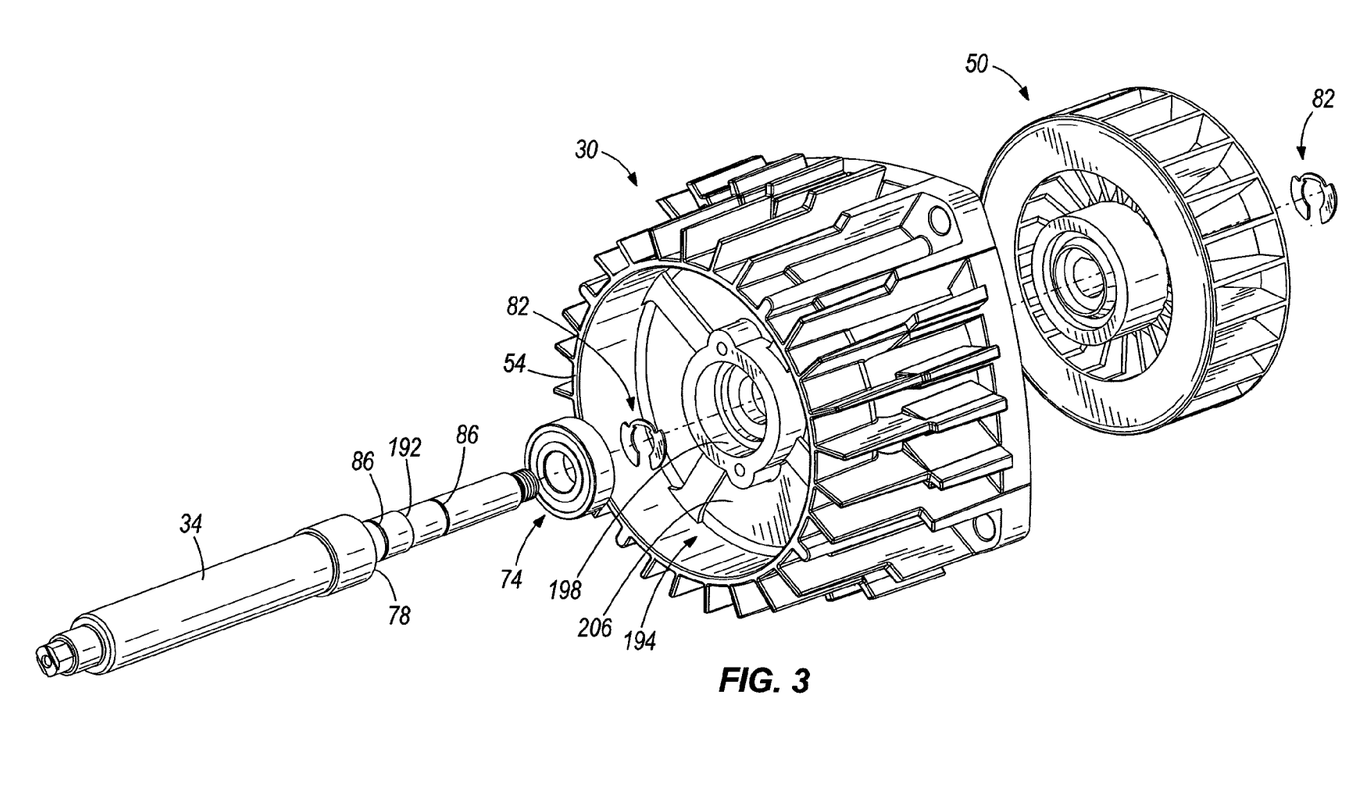
FIG. 3 is an exploded view of the end-frame, fan and rotor assembly of FIG. 1.

FIG. 3 is an exploded view of the fan-end subassembly 46, showing the order of assembly. The fan 50 is assembled with the shaft 34 and end-frame 30 from the fan-end 58. In the illustrated embodiment, the fan 50 is retained axially on the shaft 34 between a shaft shoulder 192 and the resilient clip 82. The resilient clip 82 may also be referred to as a C-clip or E-clip, depending on the particular configuration. As discussed in greater detail below, the fan 50 is coupled to the rotor shaft 34 so as to rotate without slippage relative to shaft 34.

The end-frame bearing 74 is assembled with the end frame 30 from the winding end 54. The winding end 54 surrounds a winding cavity 194. When assembled as a motor assembly 10, the winding cavity 194 receives the second end 22 of the stator 14. A bearing seat 198 is located on a face 206 of the winding cavity 194. The bearing seat 198 is sized to receive the end-frame bearing 74 illustrated in FIG. 2.

Figure 4:
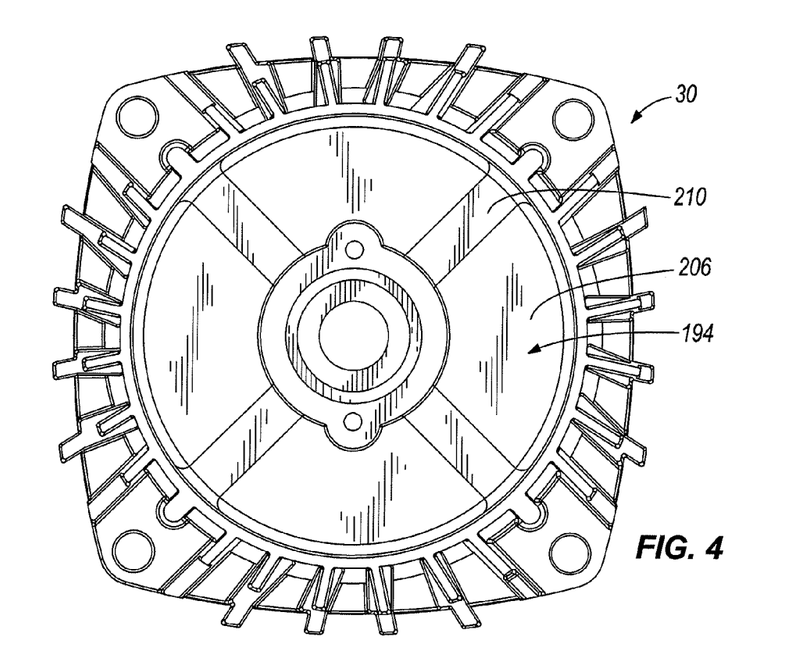
FIG. 4 is a top view of the end-frame of FIGS. 2 and 3.

FIG. 4 is a top view of the end frame, illustrating several features of the winding end 54 of the end frame 30. The face 206 of the winding cavity 194 has four reinforcement ribs 210 formed therein. The reinforcement ribs 210 reduce oscillation of the wall 98 that separates the winding cavity 194 and fan housing 62, and thereby stabilize and improve the life of the end-frame bearing 74.

Figure 5:
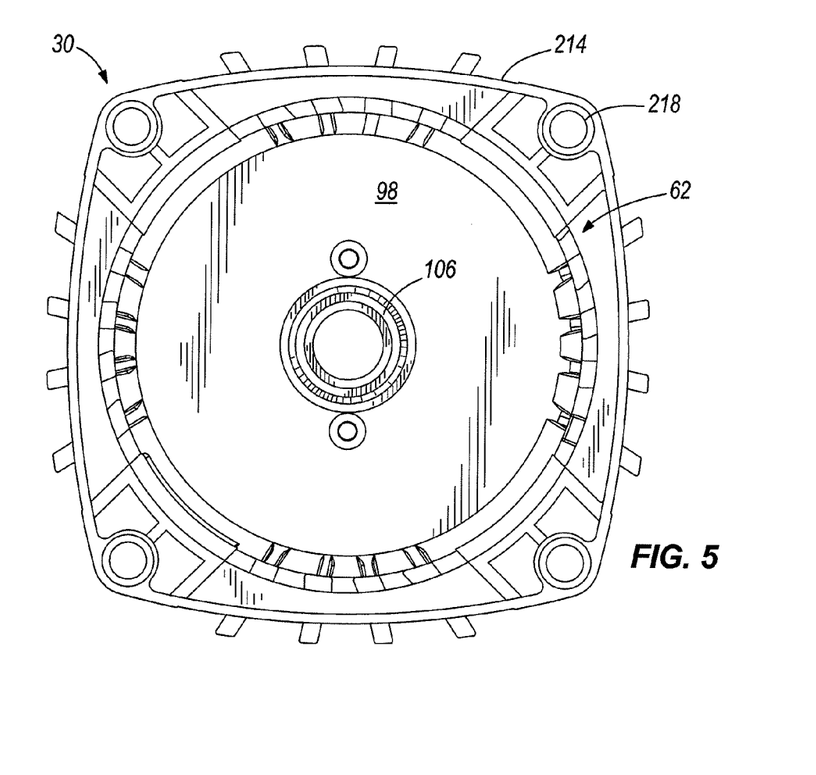
FIG. 5 is a bottom view of the end-frame of FIG. 4

FIG. 5 is a bottom view of the end-frame 30, illustrating the fan housing 62. When assembled, the fan housing 62 surrounds the fan 50 to reduce the likelihood of impact with external bodies, provide an air conduit for cooling the motor, and also provides a rigid base for mounting the motor assembly to a pump (not shown). In the illustrated embodiment, a mounting flange 214 is provided, with a total of four through-holes 218. The through-holes 218 are provided for engaging the motor assembly 10 to a pump via bolts, threaded studs, or other fastening means, and may include fewer than four holes 218 or more than four, as required.

FIG. 5 also illustrates the concentric rings 106 which form the end-frame half of the non-contact seal 94. The concentric rings 106 are centered around the rotor axis 38. In the illustrated embodiment, the concentric rings 106 are integrally formed as one piece with the wall 98. The rings may be cast, forged, machined, or otherwise formed into the wall 98. In the illustrated embodiment, the rings 106 are substantially raised from the surrounding portions of the wall 98.

Figure 6:
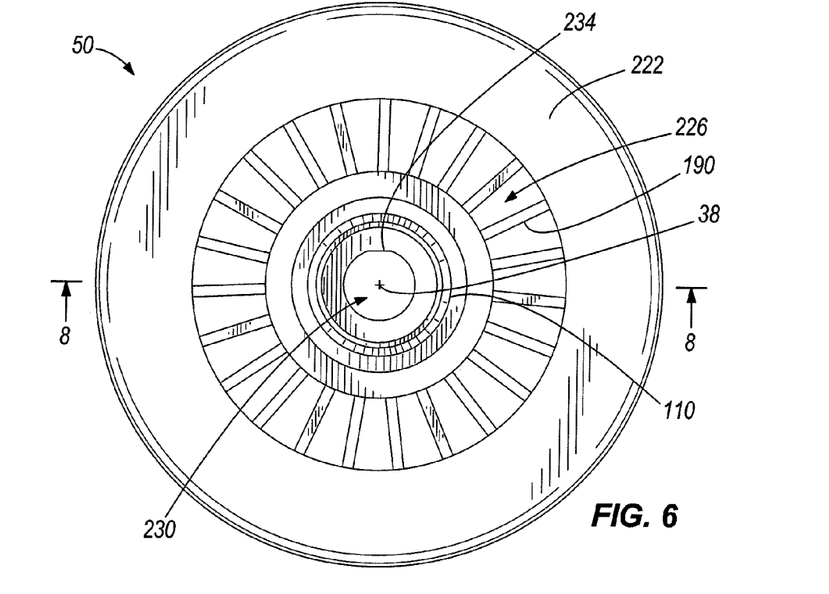
FIG. 6 is a top view of the fan of FIGS. 2 and 3.

FIG. 6 is a top view of the fan 50. A top surface 222 of the fan 50 surrounds an air inlet 226. The air inlet 226 allows for the passage of air to the plurality of radial fan blades 190. The fan blades 190 are configured to draw air through the inlet 226 and expel it radially outwards. Centered around the rotor axis 38, the concentric rings 110 are integrally formed as one piece with the top surface 222. The rings 110 may be cast, forged, machined or otherwise formed.

Figure 7:
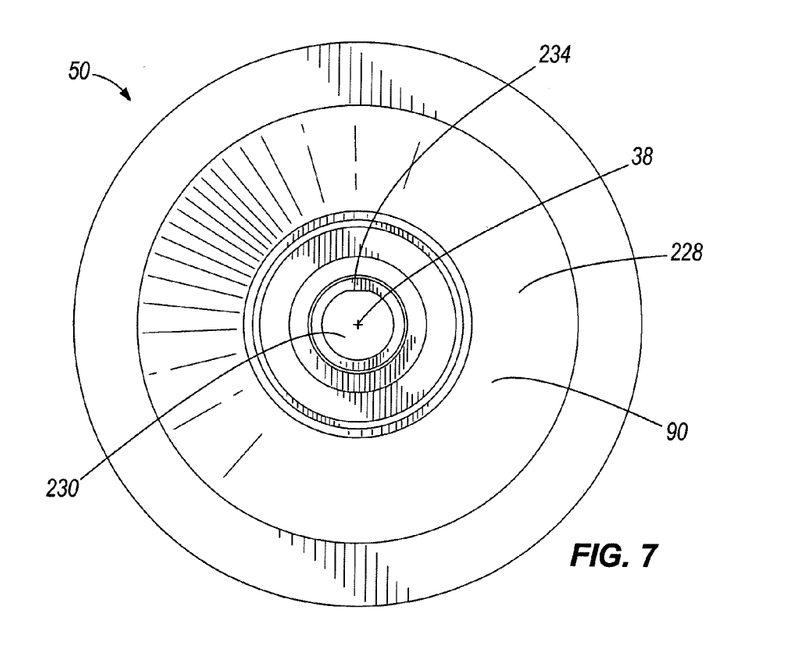
FIG. 7 is a bottom view of the fan of FIG. 6

FIG. 7 is a bottom view of the fan. The bottom surface 90 of the fan 50 defines a recess 228 having a tapered profile. The recess 228 is the backside of the slinger 174 illustrated in FIG. 2. In order to minimize rotating mass, this area of the fan 50 is hollow.

FIGS. 6 and 7 also illustrate a central aperture 230 of the fan 50. The central aperture 230 receives the shaft 34 when the fan 50 is installed in the fan housing 62. In the embodiment of FIGS. 6 and 7, the central aperture 230 has a flat 234 for mating with a corresponding non-circular surface of the shaft 34 (not shown). Alignment, or indexing, of the flat 234 with a corresponding surface of the shaft 34 locks the fan 50 into a circumferential position on the shaft 34, thereby coupling the fan 50 to the shaft 34 for synchronous rotation with the shaft 34. Those of skill in the mechanical arts will recognize that the fan 50 may be affixed to the rotor shaft 34 by various other means to ensure that the fan 50 rotates with the shaft 34 without slippage. In other embodiments, the fan 50 may be press-fitted on the rotor, held by a set screw (i.e., a "grub screw"), adhesively bonded, welded, keyed, or otherwise fixedly attached to the rotor shaft.

Figure 8:
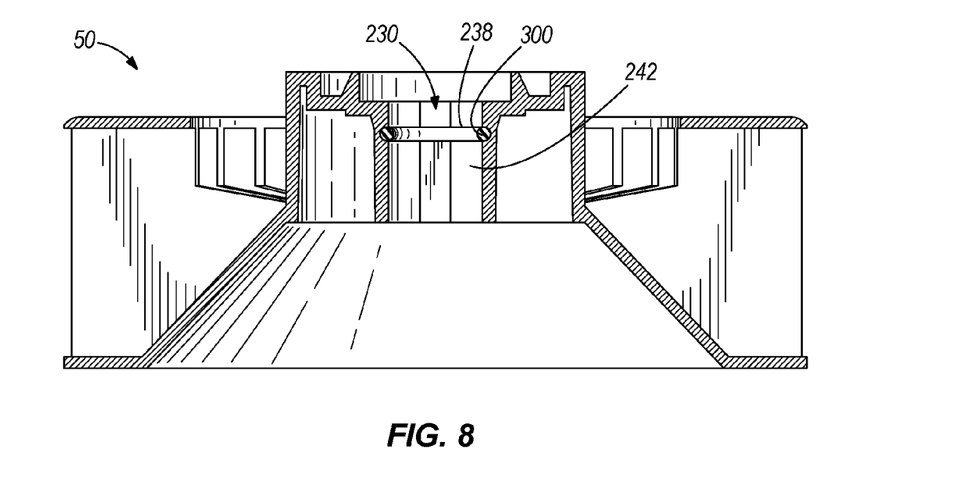
FIG. 8 is a cross section of the fan of FIG. 6 taken along line 8-8 of FIG. 6.

As illustrated in FIG. 8, the fan 50 may include a circumferential groove 238 cut within a wall 242 of the central aperture 230. The circumferential groove 238 is provided to receive a resilient o-ring 300. The o-ring 300, if employed, provides for additional sealing to inhibit the entry of water between the fan 50 and shaft 34 into the end-frame bearing 74.

Thus, the invention provides, among other things, a rain guard for use with a fan-cooled electric motor 10. Various features and advantages of the invention are set forth in the following claims.

We claim:

1. A motor comprising:
a shaft extending along a rotational axis;
an end frame including a first surface that is substantially normal to the axis;
a first plurality of annular features arranged concentrically about the rotational axis and coupled to the first surface;
a fan mounted to the rotating shaft and including an inlet, a slinger portion and a second surface; and
a second plurality of annular features arranged concentrically about the rotational axis and coupled to the second surface, the first plurality of annular features cooperating with the second plurality of annular features to form a non-contact seal between the fan and the end frame, wherein the first plurality of annular features and the second plurality of annular features are disposed radially between the shaft and the inlet.

2. The motor of claim 1, wherein the first plurality of annular features and the second plurality of annular features each include a portion having a polygonal cross-section.

3. The motor of claim 1, wherein the first plurality of annular features includes a first annular projection having a first cylindrical surface and a first frustoconical surface and a first annular recess at least partially defined by the first frustoconical surface and a second cylindrical surface.

4. The motor of claim 3, wherein the second plurality of annular features includes a second annular projection having a third cylindrical surface and a second frustoconical surface and a second annular recess at least partially defined by the second frustoconical surface and a fourth cylindrical surface.

5. The motor of claim 4, wherein the second cylindrical surface cooperates with the third cylindrical surface to define a first gap that is substantially cylindrical.

6. The motor of claim 5, wherein the first frustoconical surface cooperates with the second frustoconical surface to define a second gap that is substantially frustoconical.

7. The motor of claim 6, wherein the first cylindrical surface cooperates with the fourth cylindrical surface to define a third gap that is substantially cylindrical.

8. The motor of claim 7, wherein the second annular projection is at least partially disposed within the first annular recess to define a fourth gap that is substantially normal to the first gap and wherein the first annular projection is at least partially disposed within the second annular recess to define a fifth gap that is substantially normal to the third gap.

9. The motor of claim 1, wherein the first plurality of annular features and the second plurality of annular features cooperate to define a non-linear gap therebetween.

10. The motor of claim 1, wherein the fan defines a central aperture that includes a circumferential groove for receiving an O-ring, the O-ring sized to provide a seal between the fan and shaft.

11. The motor of claim 1, wherein the air inlet is adjacent the second surface, and wherein the fan further includes an air outlet at an outer radial portion.

12. The motor of claim 1, wherein the slinger is positioned intermediate the air inlet and air outlet, the slinger including a frustoconical surface having a small diameter near the end frame and a large diameter away from the end frame, the frustoconical surface configured to direct liquids away from the shaft and the end frame in response to rotation of the fan.

13. An electric motor comprising:
a rotor shaft for rotation about an axis;
a frame member having a wall substantially perpendicular to the axis, a first side of the wall providing a first plurality of annular features arranged concentrically about the axis and a second side of the wall providing a bearing fixture surrounding the axis, and a fan housing extending axially outward from the first side of the wall;
a radial bearing mounted within the bearing fixture; and
a fan coupled to the rotor shaft for rotation within the fan housing and including an inlet, a first surface of the fan facing the first side of the wall and having a second plurality of annular features arranged concentrically about the axis, and a second surface having a frustoconical cross-section and at least partially defining a slinger, the first plurality of annular features cooperating with the second plurality of annular features to form a non-contact seal between the fan and the frame member, wherein the first plurality of annular features and the second plurality of annular features are disposed radially between the shaft and the inlet.

14. The electric motor of claim 13, wherein the first plurality of annular features are substantially raised from a surrounding surface of the wall.

15. The electric motor of claim 13, wherein the first plurality of annular features and the second plurality of annular features each include portions having a polygonal cross-section.

16. The electric motor of claim 13, wherein the first plurality of annular features includes a first annular projection having a first cylindrical surface and a first frustoconical surface and a first annular recess at least partially defined by the first frustoconical surface and a second cylindrical surface.

17. The electric motor of claim 16, wherein the second plurality of annular features includes a second annular projection having a third cylindrical surface and a second frustoconical surface and a second annular recess at least partially defined by the second frustoconical surface and a fourth cylindrical surface.

18. The electric motor of claim 17, wherein the second cylindrical surface cooperates with the third cylindrical surface to define a first gap that is substantially cylindrical.

19. The electric motor of claim 18, wherein the first frustoconical surface cooperates with the second frustoconical surface to define a second gap that is substantially frustoconical.

20. The electric motor of claim 19, wherein the first cylindrical surface cooperates with the fourth cylindrical surface to define a third gap that is substantially cylindrical.

21. The electric motor of claim 20, wherein the second annular projection is at least partially disposed within the first annular recess to define a fourth gap that is substantially normal to the first gap and wherein the first annular projection is at least partially disposed within the second annular recess to define a fifth gap that is substantially normal to the third gap.

22. The electric motor of claim 13, wherein the first plurality of annular features and the second plurality of annular features cooperate to define a non-linear gap therebetween.

23. The electric motor of claim 13, wherein the fan defines a central aperture that includes a circumferential groove for receiving an O-ring, the O-ring sized to provide a seal between the fan and shaft.

24. The electric motor of claim 13, wherein the slinger is positioned intermediate the air inlet and air outlet, the slinger including a frustoconical surface having a small diameter near the end frame and a large diameter away from the end frame, the frustoconical surface configured to direct liquids away from the shaft and the end frame in response to rotation of the fan.

\* \* \* \* \*